United States Patent [19]

Saito

[11] Patent Number: 4,701,972

[45] Date of Patent: Oct. 27, 1987

[54] ROTARY WINDOW CLEANER

[75] Inventor: Shosaku Saito, Shizuoka, Japan

[73] Assignee: Saito Motors CC., Ltd., Shizuoka, Japan

[21] Appl. No.: 756,019

[22] Filed: Jul. 17, 1985

[51] Int. Cl.⁴ ............................................... B60S 1/44
[52] U.S. Cl. .............................. 15/250.22; 15/250.16; 15/250.27
[58] Field of Search ........... 15/250.16, 250.17, 250.22, 15/250.27

[56] References Cited

U.S. PATENT DOCUMENTS

| 2,607,066 | 8/1952 | Morton | 15/250.22 |
| 3,648,323 | 3/1972 | Le Blanc, Sr. | 15/250.22 |
| 3,649,990 | 3/1972 | Saito | 15/250.22 |
| 3,887,958 | 6/1975 | Fukasawa et al. | 15/250.22 |

Primary Examiner—Peter Feldman
Attorney, Agent, or Firm—Murray Schaffer

[57] ABSTRACT

A rotary windshield wiper comprising a gear case having a stationary portion and the rotary portion. A cylinder extending from the rotary portion toward the window at the end of which is supported the rotary wiper. Wiper being rotated by a gear train extending through the cylinder and the gear case are connected to a motor. The rotary portion is connected to an operating arm by which it is moved so as to raise and lower the cylinder holding the rotary wiper.

6 Claims, 11 Drawing Figures

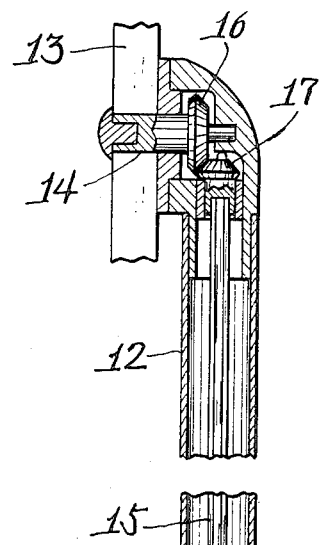
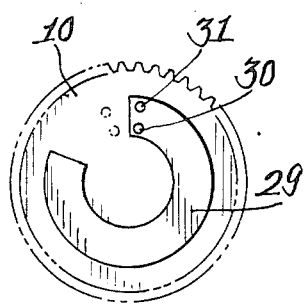
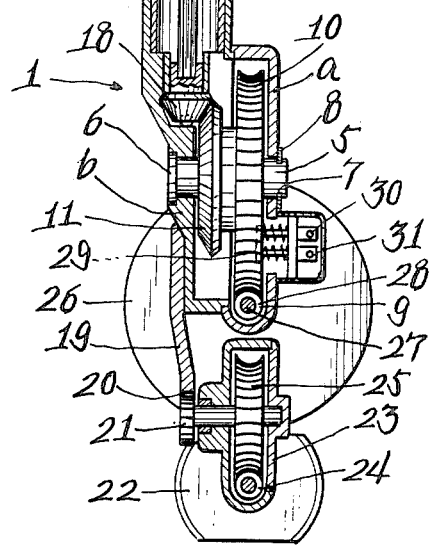
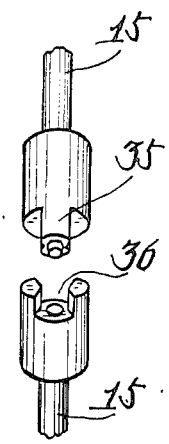
FIG. 3.
FIG. 4.
FIG. 5.

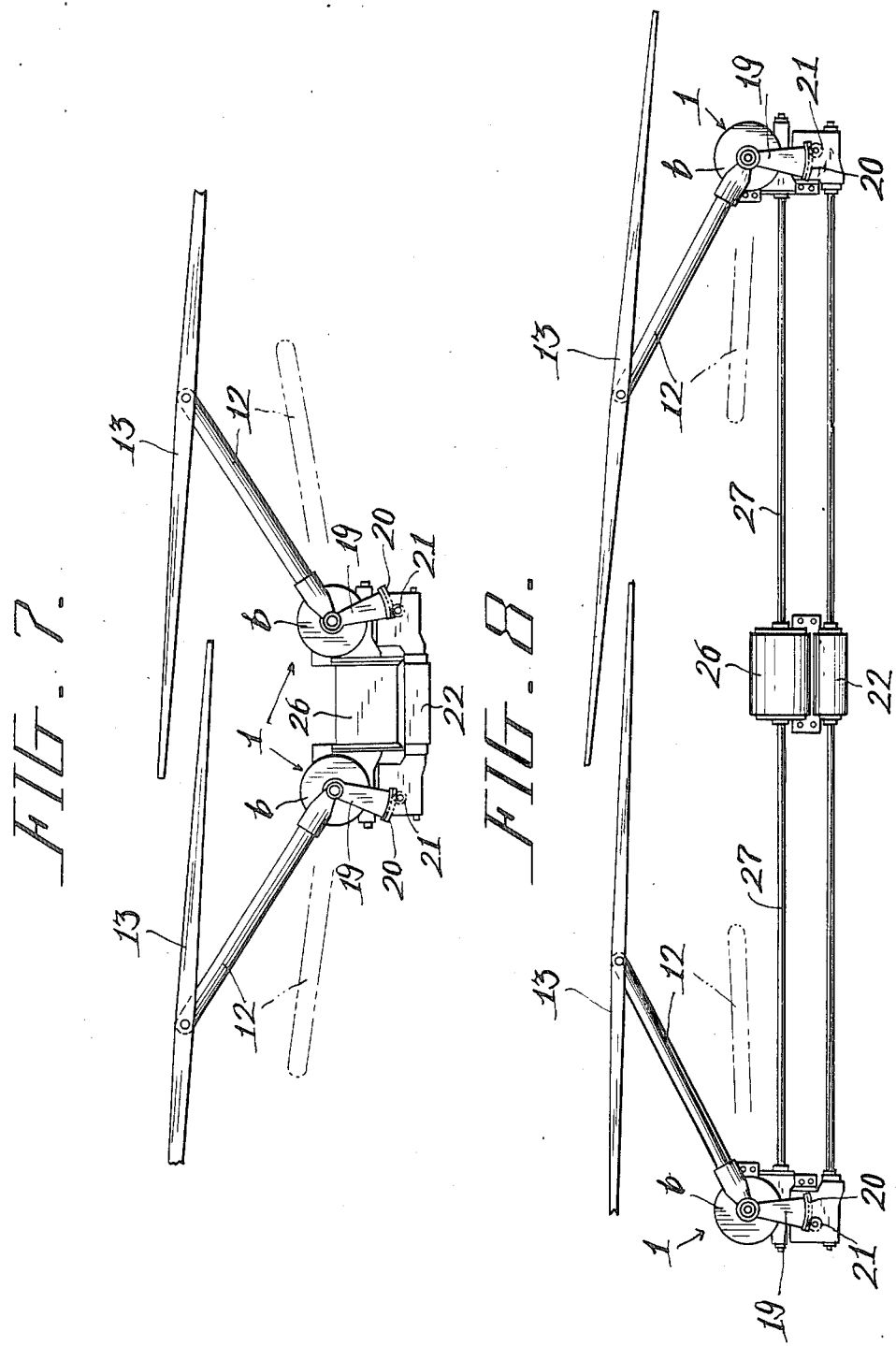

ROTARY WINDOW CLEANER

BACKGROUND OF THE INVENTION

This invention relates to a rotary window wipers for windshields of vehicles so as to wipe away rain and snow by the rotation of a wiper.

This kind of window wipers is already disclosed in U.S. Pat. No. 3,649,990. This known rotary window wipers is composed of a holder being a sliding portion which is engaged with a fixed elevation guide so as to be freely elevated and lowered, and a wiper which is supported at the forward end of the holder in such a manner that the wiper is continuously rotated in one direction, whereby the rain and snow of the window is wiped away so completely as to ensure good visibility at all times.

In the known rotary window wipers, however, the supporting system, the driving system and the elevating system for the wiper are provided separately, and they are connected by a flexible shaft, link, or the like, making the structure complicated and requiring a number of parts, resulting in high manufacturing costs and troublesome installation procedures. Special technical skill and a large space are thus required for installation. These problems have prevented the window wipers of this type from coming into general use in spite of a recognition of its efficiency.

SUMMARY OF THE INVENTION

Accordingly it is an object of the invention to provide a rotary window wipers which may be produced at low cost, can be easily installed on vehicles without any special technical skill, and which requires a small space for installation. Briefly, this is obtained by uniting the supporting system, the driving system and the elevating system of the wiper into one.

The rotary window wipers according to the invention, is composed of a gear case consisting of a fixed portion and a rotary portion which is rotatable in relation to the fixed portion. The gears which are accommodated in the gear case, transfer the power from a motor to the wiper. A supporting cylinder is connected to the rotary portion of the gear case such as to extend toward the windshield and supports the wiper at its forward end so as to be rotated by the gears. An operating arm, attached to the rotary portion, cooperates with a cylinder moving mechanism which is connected to the operating arm so as to pivotally raise and lower the wiper supporting cylinder by the lateral motion of the operating arm.

The above and other objects, features and advantages of the present invention will become clear from the following description of the preferred embodiments thereof, taken in conjunction with the accompanying drawings.

BRIEF DESCRIPTION OF THE DRAWINGS

FIG. 3 is a sectional view of the window wipers shown in FIG. 1 taken along the line A—A;

FIG. 4 is an elevational view of a stop position controlling mechanism for a wiper supporting cylinder;

FIG. 5 is an exploded perspective view of a rotating lag setting mechanism in a double throw rotary window wipers;

FIG. 6 is an elevational view of a gear case showing the arrangement of the gears therein;

FIGS. 7 and 8 are elevational views of a double throw rotary window wipers;

DESCRIPTION OF THE PREFERRED EMBODIMENTS

Figure 1:
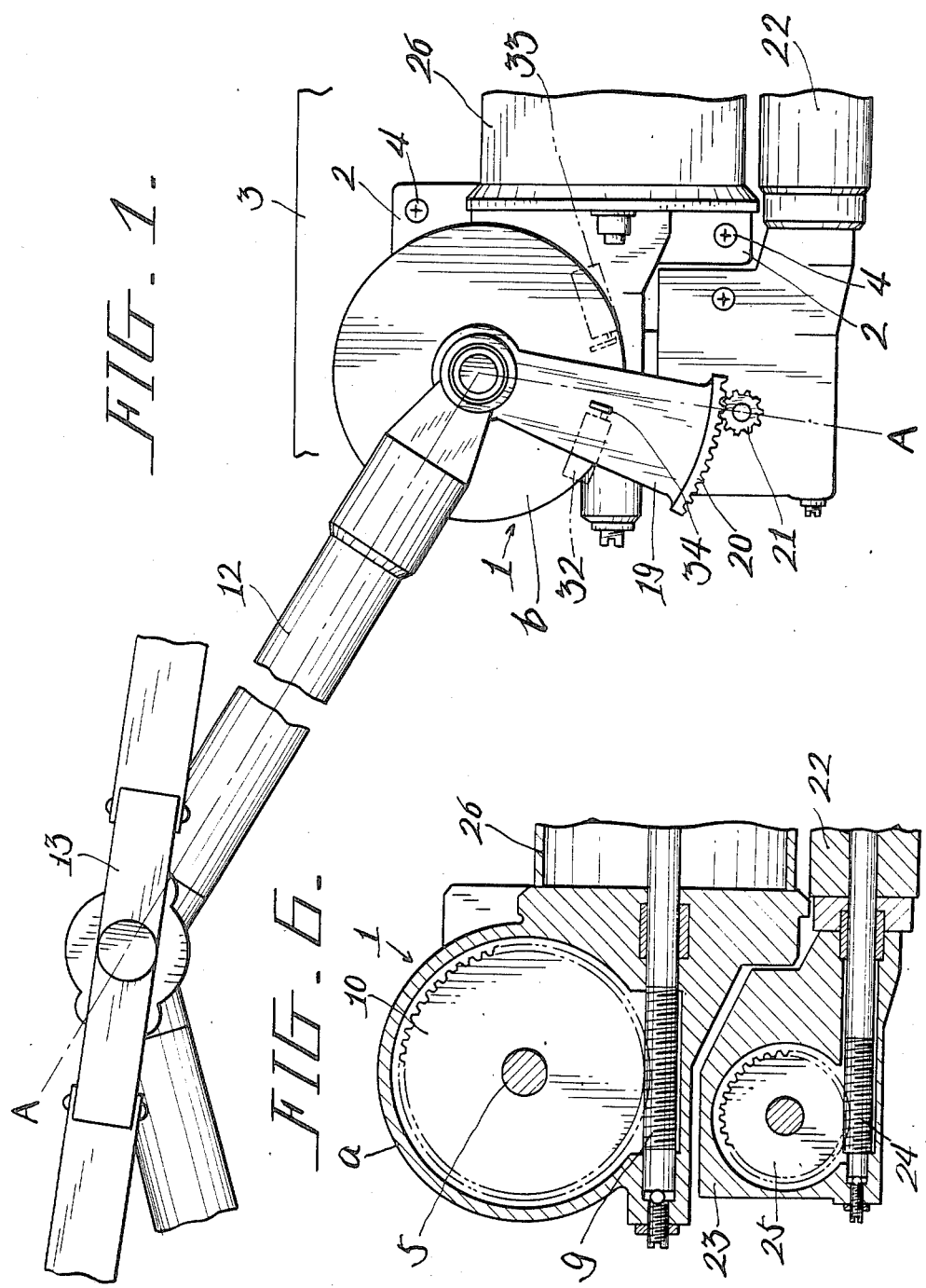
FIG. 1 is a partially cutaway view of a rotary window wipers for vehicles according to the invention.

In the embodiment shown in FIGS. 1 to 6, a gear case 1 is composed of a fixed portion or stator a which is attached to a wall or mounting member 3 of a vehicle by means of fittings 2 and screws 4 and a rotary portion or rotor b rotatably located within the stator. The rotor b is mounted on a shaft 5 having a head portion 6 at one end and an annular groove 7 at the other end into which a snap ring 8 is engaged. The shaft 5 extends through the centers of the stator a and the rotor b. Both the fixed stator portion a and the rotor portion b are bonded in such a manner that slight rotation of each may take place with respect to the other. The gear case 1 accommodates a worm 9 which is secured to the shaft 27 of a motor 26, a worm wheel 10 which is intermeshed with the worm 9, and a bevel gear 11 which is integrally connected with the worm wheel 10; all three being supported by the shaft 5.

Figure 2:
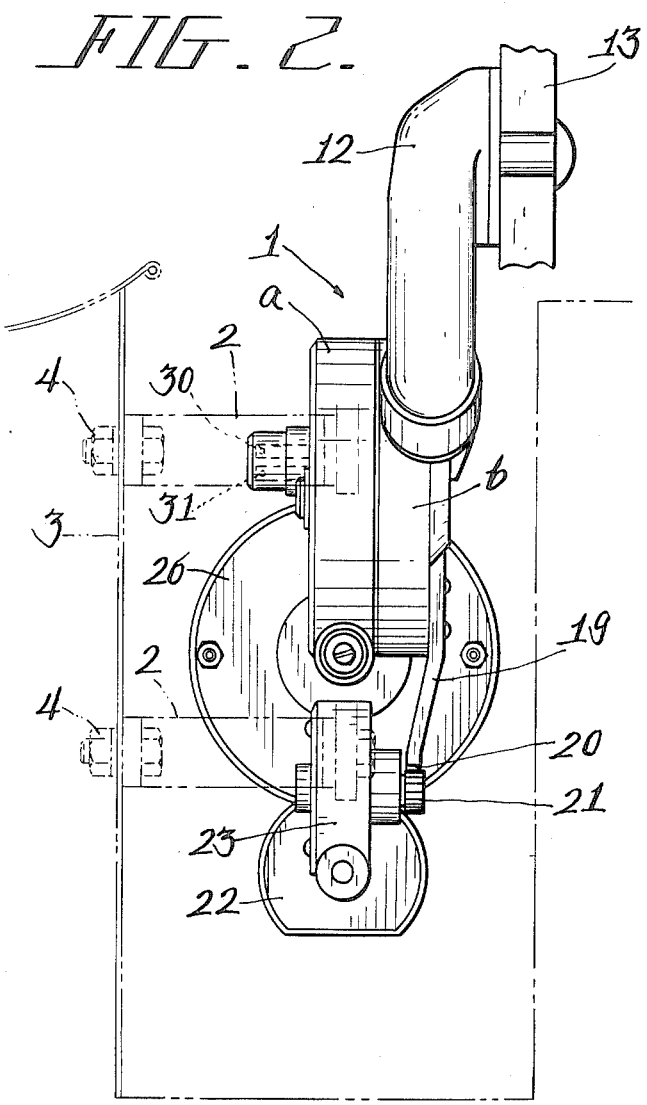
FIG. 2 is a slide elevational view of the window wipers shown in FIG. 1.

As is shown in FIGS. 1 to 3, a supporting cylinder 12 extends from the rotor b of the gear case 1 so as to be proximate the windshield and has at the forward end a wiper 13 supported by a shaft 14. As is shown in FIG. 3 a relay shaft 15 having a hexagonal cross-section extends through the cylinder 12 having at its forward end a bevel gear 16 secured to the shaft 14 of the wiper 13. A bevel gear 18 is also attached at the base end of the relay shaft 15 which intermeshes with the bevel gear 11 on the worm 10. The wiper 13 is thus rotated by the reversible motor 26 as will be described later. The bevel gears 16 and 18 are attached to the relay shaft 15 by inserting the relay shaft 15 into holes formed on the bosses of the bevel gears 16 and 18 which holes conform to the hexagonal cross-section of the relay shaft 15.

Attached to the lower portion of the rotor b of the gear case 1 is a moving mechanism for raising and lowering the cylinder 12. As is shown in FIG. 3, this mechanism comprises a pinion 21, to which the rotation of a reversible motor 22 is transmitted after being reduced by a worm 24, and a worm wheel 25 housed in a gear case 23. The pinion 21 intermeshes with gear 20 formed at the periphery of a sector shaped operating arm 19 which is fixed at its inner end to the rotor 6. Rotation of the pinion 21 is thus transmitted via the operating arm 19 to cause the supporting cylinder 12 of the wiper 13 to be raised or lowered.

The shaft 27 of the reversible motor 26 which drives the wiper 13, is provided with a worm 28 which intermeshes with the worm wheel 10 as shown in FIG. 3, the worm 28 being disposed on the portion of the shaft 27 which is inserted into the gear case 1.

A stop position controlling device for consistently arresting the wiper 13 in an approximately horizontal state is composed of an arcuate electric contact ring 29 which is insulated and attached to the side surface of the worm wheel 10, as is shown in FIGS. 3 and 4. Contactors 30, 31 are connected to the electric contact ring 29 at an intermediate portion of a feeding circuit, whereby the switch is kept in the "on" state while the contactors 30, 31 are in contact with the ring 29, and is switched off when the contactors 30, 31 are separated from the arcuate contact portion, at which time the motor 26 is stopped and the stopping position of the wiper 13 is decided.

The switches 32 and 33 (FIG. 1) stop the supporting cylinder 12 of the wiper 13 at a working position and a storing portion, respectively. The switch 32 is disposed at a position where it is actuated by a finger 34 attached to the operating arm 19 when the supporting cylinder 12 reaches the working position, as is shown in FIG. 1, while the switch 32 is disposed at a position where it is actuated by the finger 34 when the supporting cylinder 12 reaches the storing position. The switches 32 and 33 suspend the operation of the motor 22 when they are actuated.

When more than two rotary wipers are provided in one apparatus, as is shown in FIGS. 7 and 8, rotation lag setting members 35, 36 as shown in FIG. 5 are provided at an intermediate portion of the relay shaft 15 in order to prevent the two wipers 13 from interfering with each other. One of the setting members 35 is constituted by a protrusion while the other 36 is a notch. A clearance is provided between the two members, whereby the rotation of one wiper 13 is caused to lag behind the other 13 by a degree equivalent to this clearance.

Figure 11:
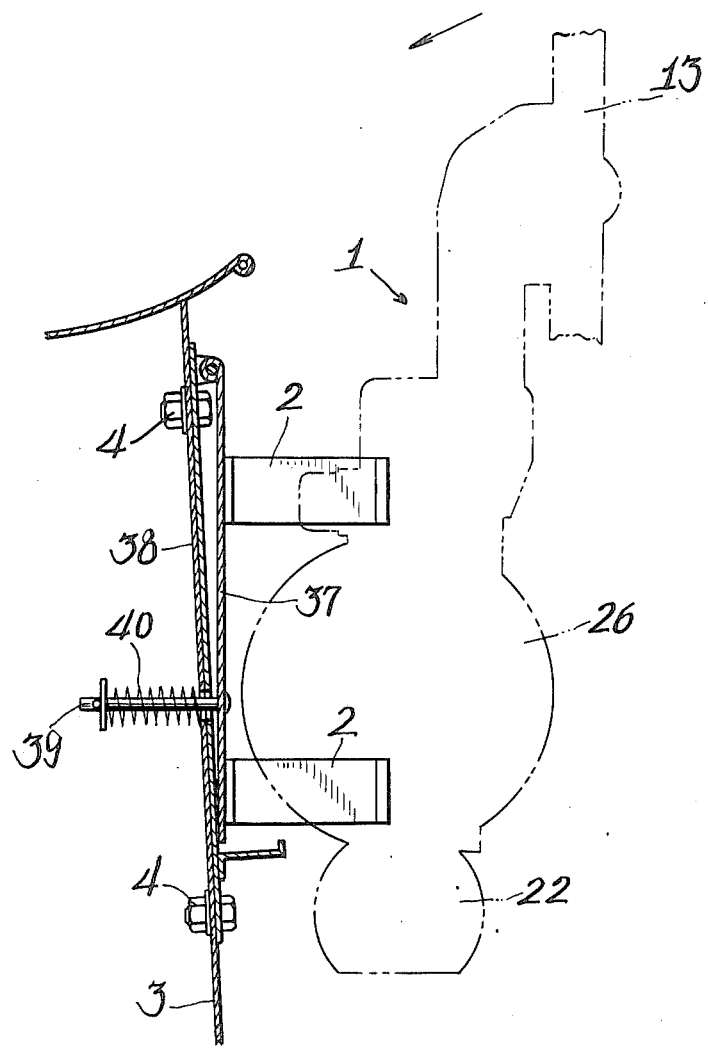
FIG. 11 is a side elevational view of a mechanism for elastically attaching a gear case.

In FIG. 11 an elastic installation of the gear case 1 is shown wherein the upper end of a movable adapter plate 37 is bolted to a base plate 38, and a shaft rod 39, penetrating the base plate 38 and the mounting wall portion 3 of the vehicle, is secured to the lower end of the adapter plate 37. A spring 40 is placed over the shaft rod 39 so as to incline the movable adapter plate 37 toward the windshield. Thus, when the wiper 13 comes into contact with the window so as to wipe it, the movable adapter plate 37 is raised in resistance to the urging of the spring 40, this counterforce being utilized as a force for pressing the wiper 13 onto the surface of the windshield.

The embodiment described above is used as a single unit when it is used for small-sized vehicles and a single wiper 13 is sufficient, but when it is used for normal vehicles two wipers are provided in one apparatus, and when it is used for large-sized vehicles, particularly for vehicles with wide windows, three wipers may be combined. When a pair of gear cases 1 are mounted in combination with a single reversible motor 26 to provide a double throw apparatus as shown in FIG. 7, each of the supporting cylinders 12, 12 of the wipers 13, 13 is lowered outward toward the side edge of the window in the storing state and raised up inwardly in the working state. On the other hand, when a pair of gear cases 1, 1 are disposed separately and apart from each other on either side of a window, the motor 26 is disposed at an intermediate position, and the motor shaft 27 is extended such as to be inserted into the gear cases 1, 1 as is shown in FIG. 8. Here, each of the supporting cylinders 13, 13 being lowered inwardly of the sides of the window in the storing state, and raised up outwardly in the working state.

The rotary window cleaner according to the above-described embodiments can be easily installed on a vehicle without employing any special techniques by securing the gear case 1 to the mounting wall portion 3 of a vehicle in such a manner that the wiper 13 corresponds to the portion of the windshield which is to be wiped in the working state when the supporting cylinder 12 of the wiper 13 is raised. When the motor 26 is rotated, the rotation of the motor 26 is transmitted to the wiper 13 after being reduced by the pairs of gears 9, 10 and 11, 19 and this rotation of the wiper 13 effeceively wipes the portion of the window glass to be cleaned. On the other hand, when the cylinder moving mechanism 21 of the supporting cylinder 12 is rotated by the motor 22 and the rotary portion b of the gear case 1 is rotated by the operating arm 19 in the direction of lowering the supporting cylinder 12, the wiper 13 comes to rest at a lower corner of the window where it does not obstruct visibility, thus assuming a proper storing state.

When the wiper 13 is used, the pinion 21 of the cylinder moving mechanism is reversely rotated by the motor 22, whereby the rotary portion b of the gear case 1 is rotated in the direction in which the supporting cylinder 12 is raised up, and the wiper 13 is located at the portion of the windshield to be wiped. When the motor 26 is rotated in this state, the wiper 13 passes over the glass surface while wiping it at an appropriate speed, thereby wiping away the rain and snow which would settle on the window. Thus, the cleaner denies any possibility of obstruction of visibility due to rain or snow in both high-speed travel as well as in more normal travelling conditions.

Figure 9:
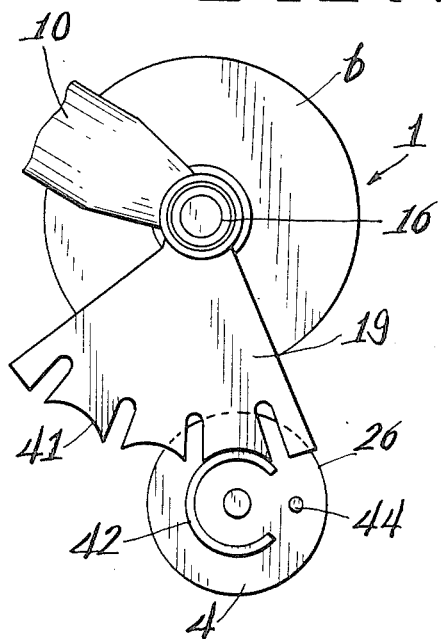
FIGS. 9 and 10 are elevational view of the elevating systems in other embodiments of the invention.
Figure 10:
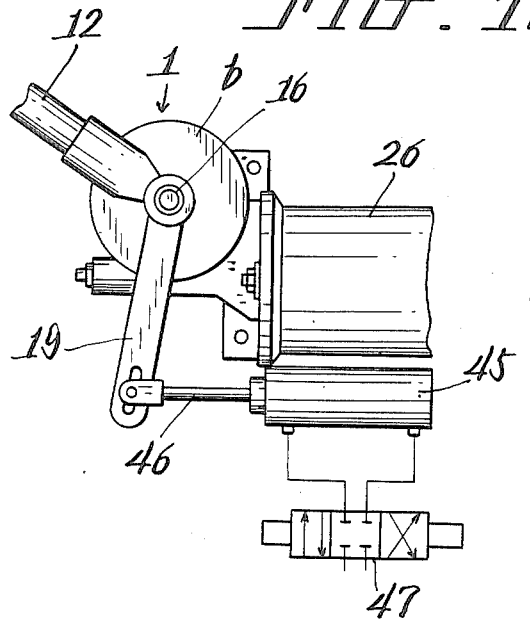

Referring now to FIGS. 9 and 10, which show another embodiment of the invention, the supporting system and the drive system of the wiper 13 are the same as in the embodiment shown in FIGS. 1 to 8, but the elevating system is different.

In the embodiment shown in FIG. 9, a Geneva gear 41 is provided on the sector shaped operating arm 19 which is attached to the rotary portion b of the gear case 1. An arcuate ring 42 and a pin 43, offset at a point which is midway between the two ends of the arc constituted by the arcuate ring 42, are on the face of a pin wheel 44. The pin wheel 44 is mounted centrally on the shaft 44 of the motor 22 so that the rotation of the motor 22 is transmitted to the operating arm 19 after reducing it in the same way as the cylinder moving mechanism 21 shown in FIG. 3. The lateral motion of the pin wheel 44 rotates the rotary portion b, whereby the supporting cylinder 12 of the wiper 13 is raised and lowered.

In the embodiment shown in FIG. 10, the operating arm 19 attached to the rotary portion b of the gear case 1 consists of a lever, to which the rod 46 of a small-sized cylinder 45 is connected. The rotary portion b is rotated by virtue of the lateral movement of the rod 46 effected by selectively charging pressurized fluid into the two chambers of the cylinder 45 by the action of a change-over valve or by alternately reducing the pressures of the two chambers. The rotation of the rotary portion b raises and lowers the supporting cylinder 12 by the same operation as the embodiment shown in FIGS. 1 to 8.

In a rotary window cleaner according to the invention, since the supporting system, the driving system and the elevating system of the wiper are united into one in the gear case, the structure is simplified, and the number of parts to be used is reduced, as in the manufacturing cost.

Furthermore, the compact design of the cleaner as a whole requires only a small space for installation and hence enables installation on a small-sized vehicle.

In addition, installation is effected simply by securing the fixed portion of the gear case without the need to employ and special technique, and rapid and precise installation which achieve the expected efficiency is thus enabled.

While there has been described what is at present considered to be the preferred embodiments of the invention, it will be understood that various modifications may be made thereto, and it is intended that the appended claims cover all such modifications as fall within the true spirit and scope of the invention.

What is claimed is:

1. A rotary windshield cleaner comprising:
   a drive motor, a gear case having a fixed portion and a rotary portion;
   a supporting cylinder secured at one end to the rotary portion of said gear case and having wiper means rotatably mounted at the other end;
   gear means disposed within said gear case and connected to the output shaft of said drive motor to reduce the power from said motor;
   a power transmission train extending through said supporting cylinder and engaged at one end with the gear means accommodated in said gear case and connected at the other end to the wiper means for rotating the wiper means;
   an elevating mechanism for swinging the rotary portion of said gear case with respect to the fixed portion such that said power transmission train remains engaged with the gears accommodated in the gear case while said supporting cylinder is moved between a raised and lowered position.

2. The rotary window cleaner according to claim 1, wherein said gear means accommodated in said gear case is provided with stop position controlling members for consistently arresting actuation of said drive means when said wiper means is lowered into a horizontal position.

3. The rotary window cleaner according to claim 1, including a pair of gear cases are disposed on the opposite sides of said motor, each of said gear cases being provided with a supporting cylinder having wiper means mounted rotatably at one end, said supporting cylinder having wiper means mounted rotatably at one end, said supporting cylinder being provided with a relay shaft which forms said power transmission train for transmitting the rotation of said motor to said wiper means, and rotation lag setting means disposed along said relay shaft of at least one of said supporting cylinders in order to prevent said two wiper means from interfering with each other.

4. The rotary window cleaner according to claim 1, wherein said elevating mechanism includes an operating arm which is attached to the lower portion of said rotary gear case portion, said operating arm having a gear intermeshing with a pinion connected to a reversible motor.

5. The rotary window cleaner according to claim 1, wherein said elevating mechanism includes an operating arm which is attached to the lower portion of said rotary gear case portion, said operating arm having a Geneva gear engaging with a pin wheel, said pin wheel being provided with a pin and an arcuate ring and being disposed on the rotation shaft of a gear case connected to a reversible motor.

6. The rotary window cleaner according to claim 1, wherein said elevating mechanism includes an operating arm which is attached to the lower portion of said rotary gear case portion and which is composed of a lever which is connected to a rod of a small-sized fluid cylinder provided with a change-over valve for moving said rod.

* * * * *